(12) United States Patent
Hashimoto

(10) Patent No.: US 11,161,278 B2
(45) Date of Patent: Nov. 2, 2021

(54) SEALING DEVICE AND RUBBER HOSE CONTINUOUS VULCANIZING DEVICE PROVIDED WITH SAME, AND SEALING METHOD AND RUBBER HOSE CONTINUOUS VULCANIZING METHOD PROVIDED WITH SAME

(71) Applicant: NICHIRIN CO., LTD., Kobe (JP)

(72) Inventor: Hideki Hashimoto, Himeji (JP)

(73) Assignee: NICHIRIN CO., LTD., Kobe (JP)

( * ) Notice: Subject to any disclaimer, the term of this patent is extended or adjusted under 35 U.S.C. 154(b) by 150 days.

(21) Appl. No.: 16/312,838

(22) PCT Filed: May 2, 2017

(86) PCT No.: PCT/JP2017/017277
§ 371 (c)(1),
(2) Date: Dec. 21, 2018

(87) PCT Pub. No.: WO2017/221556
PCT Pub. Date: Dec. 28, 2017

(65) Prior Publication Data
US 2019/0358862 A1  Nov. 28, 2019

(30) Foreign Application Priority Data
Jun. 22, 2016  (JP) .............................. JP2016-123351

(51) Int. Cl.
*B29C 35/06* (2006.01)
*F16J 15/02* (2006.01)
(Continued)

(52) U.S. Cl.
CPC ............... *B29C 35/06* (2013.01); *F16J 15/02* (2013.01); *B29C 48/0016* (2019.02);
(Continued)

(58) Field of Classification Search
CPC ...... B29C 35/06; B29C 48/0016; F16J 15/02; B29L 2023/005; F16L 11/04; B29D 23/001
See application file for complete search history.

(56) References Cited

U.S. PATENT DOCUMENTS 2,320,564 A * 6/1943 Raymond ............. B29C 33/048
                                                        264/563
2,789,314 A * 4/1957 Davis ..................... B29C 35/065
                                                        425/86

(Continued)

FOREIGN PATENT DOCUMENTS

| CN | 1177686 A | 4/1998 |
|----|-----------|--------|
| CN | 204566499 U | 8/2015 |

(Continued)

OTHER PUBLICATIONS

Korean Office Action dated Feb. 21, 2019 in Korean Patent Application No. 10-2019-7000520 (with English translation), citing document AO therein, 7 pages.

(Continued)

*Primary Examiner* — Michael H. Wilson
*Assistant Examiner* — Guy F Mongelli
(74) *Attorney, Agent, or Firm* — Oblon, McClelland, Maier & Neustadt, L.L.P.

(57) ABSTRACT

Damage of the outer surface of a rubber hose due to friction can be prevented while the sealing performance and the productivity are ensured.

The following components are provided: a pipe 11 whose one end is connected to a vulcanization pipe and in which pressed liquid is pumped from an inlet 11*a* disposed at the side face of the other end side; an annular member 12 which is attached to the pipe 11 so as to close an opening of the other end side of the pipe 11, and includes a hole 12*a* whose diameter is larger than the outer diameter of a rubber hose (Continued)

and in which the rubber hose passes through; and a pump which pumps more liquid than the liquid discharged outside the pipe 11 through the gap between the hole 12a and the rubber hose into an inlet 11a.

7 Claims, 3 Drawing Sheets

(51) Int. Cl.
  *B29C 48/00* (2019.01)
  *B29D 23/00* (2006.01)
  *B29L 23/00* (2006.01)
  *F16L 11/04* (2006.01)

(52) U.S. Cl.
  CPC ....... *B29D 23/001* (2013.01); *B29L 2023/005* (2013.01); *F16L 11/04* (2013.01)

(56) References Cited

U.S. PATENT DOCUMENTS

| | | | | | |
|---|---|---|---|---|---|
| 3,345,689 | A | * | 10/1967 | Lister | B29C 35/04 425/387.1 |
| 3,354,243 | A | * | 11/1967 | Dodge | B29C 48/12 264/419 |
| 3,368,017 | A | * | 2/1968 | Lister | B29D 23/001 264/347 |
| 3,368,240 | A | * | 2/1968 | Lister | B29D 23/001 269/153 |
| 3,699,197 | A | * | 10/1972 | Egger | B29C 35/06 264/40.7 |
| 3,859,408 | A | * | 1/1975 | Voss | B29C 33/04 264/506 |
| 3,972,757 | A | * | 8/1976 | Derderian | B29D 23/001 156/143 |
| 4,029,450 | A | * | 6/1977 | Caser | B29C 35/065 425/71 |
| 4,115,511 | A | * | 9/1978 | Mauritzon | B29C 35/0233 264/236 |
| 4,178,968 | A | * | 12/1979 | Angioletti | B29C 35/065 138/126 |
| 4,179,256 | A | * | 12/1979 | Tomioka | B29C 35/065 425/71 |
| 4,209,484 | A | * | 6/1980 | Denis | B29C 35/06 264/184 |
| 4,247,271 | A | * | 1/1981 | Yonekura | B29C 35/065 425/68 |
| 4,342,718 | A | * | 8/1982 | Caratsch | B29C 35/06 264/136 |
| 4,489,021 | A | * | 12/1984 | Antal | B29C 31/002 156/149 |
| 4,657,969 | A | * | 4/1987 | Martin | B29C 33/68 264/474 |
| 4,702,867 | A | * | 10/1987 | Sejimo | B29C 33/68 264/474 |
| 5,124,109 | A | * | 6/1992 | Drossbach | B29C 48/902 264/508 |
| 5,918,641 | A | * | 7/1999 | Hardy | F16L 11/087 138/132 |
| 9,370,908 | B1 | | 6/2016 | Chapman et al. | |
| 2002/0096251 | A1 | * | 7/2002 | Harcourt | B29B 7/7495 264/140 |
| 2003/0131899 | A1 | * | 7/2003 | Baba | F16L 11/04 138/137 |
| 2005/0062191 | A1 | * | 3/2005 | Kurashige | B29B 7/7495 264/140 |
| 2006/0081319 | A1 | * | 4/2006 | Fukutani | B29D 30/70 152/451 |
| 2009/0309248 | A1 | * | 12/2009 | Miller | B29C 33/18 264/40.4 |
| 2010/0229991 | A1 | * | 9/2010 | Witz | B29D 23/001 138/109 |
| 2014/0261843 | A1 | * | 9/2014 | Graham | F16L 55/1656 138/125 |
| 2016/0053922 | A1 | * | 2/2016 | Ehsani | B29C 63/10 138/141 |

FOREIGN PATENT DOCUMENTS

| | | | |
|---|---|---|---|
| GB | 1253980 | * | 11/1967 |
| JP | 63-232217 A | | 9/1988 |
| JP | 5-138662 A | | 6/1993 |
| JP | 3192183 B2 | | 7/2001 |
| JP | 02-235610 A | | 8/2002 |
| JP | 2004-077215 A | | 3/2004 |
| JP | 2005-014233 A | | 1/2005 |
| JP | 2008-137359 A | | 6/2008 |
| JP | 2009-241490 A | | 10/2009 |
| JP | 2009241490 | * | 10/2009 |
| JP | 4982417 B2 | | 7/2012 |
| JP | 2012-187870 A | | 10/2012 |

OTHER PUBLICATIONS

Japanese Office Action issued in Japanese Patent Application No. 2016-123351 dated Jan. 4, 2017, citing documents AA and AO-AT therein (w/ English translation).

International Search Report dated Jul. 18, 2017 in PCT/JP2017/017277 dated May 2, 2017.

Combined Office Action and Search Report dated Jul. 30, 2019 in Chinese Patent Application No. 201780038831, citing documents AO and AP therein, 17 pages (with English translation and English translation of categories of cited documents).

Indian Office Action issued in Indian Patent Application No. 201817050073 dated Nov. 21, 2019.

* cited by examiner

SEALING DEVICE AND RUBBER HOSE CONTINUOUS VULCANIZING DEVICE PROVIDED WITH SAME, AND SEALING METHOD AND RUBBER HOSE CONTINUOUS VULCANIZING METHOD PROVIDED WITH SAME

TECHNICAL FIELD

The present invention relates to: sealing devices which are respectively disposed at an entrance and an exit of a continuous vulcanizing device which continuously vulcanizes a rubber hose including one or more rubber layers; a rubber hose continuous vulcanizing device provided with the sealing devices; a sealing method; and a rubber hose continuous vulcanizing method including the sealing method.

BACKGROUND ART

As a manufacturing method for manufacturing a rubber hose including one or more rubber layers, Patent Literature 1 discloses a continuous manufacturing method for manufacturing a reinforcement hose in which an inner layer, a reinforcement layer, and an outer layer are formed in this order. In the continuous manufacturing method, vulcanization is performed such that the reinforcement hose before being vulcanized is dipped in silicone oil or water-soluble/water-insoluble heating mediums.

In some cases, when a rubber hose is vulcanized, the rubber hose may be covered by resin such that the shape of the rubber hose is not deformed. The resin is removed from the rubber hose after being vulcanized and reused. However, if the vulcanization is performed with the heating medium as disclosed in Patent Literature 1, the heating medium may not be removed perfectly from the resin, with the result that the reuse rate of the resin is decreased.

To solve this problem, the rubber hose is vulcanized with steam instead of the heating medium. However, when the vulcanization is performed with steam, because steam pressure is high, the steam is likely to leak from part in which a seal is arranged so as not to leak the steam.

In this regard, in Patent Literature 2, the exit of a vulcanization container is sealed with a water sealing device, and the rubber hose vulcanized in the vulcanization container comes out from the water-sealed exit to the outside.

CITATION LIST

Patent Literatures

[Patent Literature 1] Japanese patent No. 3192183
[Patent Literature 2] Japanese patent No. 4982417

SUMMARY OF INVENTION

Technical Problem

However, in Patent Literature 2, a sealing member elastically makes contact with the rubber hose with appropriate friction force. Therefore, leak of the sealing water of the water sealing device to the outside through the sealing member can be suppressed, but the following problems may occur: reduction of the sealing performance due to wearing out of the sealing member; and reduction of the productivity due to clogging of the rubber hose in the water sealing device because the rubber hose is pressed by the sealing member and is deformed. Furthermore, the outer surface of the rubber hose may be damaged because of friction between the sealing member and the rubber hose.

The present invention was done to solve the problem above, and an object of the present invention is to provide: a sealing device which is configured to be able to prevent damage of the outer surface of a rubber hose due to friction, while ensuring the sealing performance and the productivity; a rubber hose continuous vulcanizing device provided with same; a sealing method; and a rubber hose continuous vulcanizing method provided with same.

Solution to Problem

The present invention relates to a sealing device which is disposed at each of an entrance and an exit of a rubber hose continuous vulcanizing device configured to continuously vulcanize a rubber hose including one or more rubber layers by causing the rubber hose to pass through the inside of a vulcanization pipe filled with steam, and the sealing device comprises: a pipe whose one end is connected to the vulcanization pipe and in which pressed liquid is pumped from an inlet disposed at the side face of the other end side; an annular member which is attached to the pipe so as to close an opening of the other end side of the pipe, and includes a hole whose diameter is larger than the outer diameter of the rubber hose and in which the rubber hose passes through; and a pump which pumps more liquid than the liquid discharged outside the pipe through the gap between the hole and the rubber hose into the inlet.

The present invention relates to a sealing method for sealing each of an entrance and an exit of a rubber hose continuous vulcanizing device which is configured to continuously vulcanize a rubber hose including one or more rubber layers by causing the rubber hose to pass through the inside of a vulcanization pipe filled with steam, and the method comprises the steps of: pumping pressurized liquid into an inlet provided in a side face on the other end side of a pipe having one end connected to the vulcanization pipe; and causing the rubber hose to pass through a hole whose diameter is larger than the outer diameter of the rubber hose, and the hole is provided in an annular member attached to the pipe so as to close an opening on the other end side of the pipe, and the pump pumps more liquid into the inlet than the liquid discharged outside of the pipe through the gap between the hole and the rubber hose.

Advantageous Effects of Invention

According to the present invention, part of the liquid pumped into the pipe is discharged outside of the pipe through the gap between the rubber hose and the hole liquid which is provided in the annular member and in which a rubber hose passes thorough. However, by pumping more liquid than the liquid discharged outside of the pipe into the inlet, the rest of the liquid is stored in the pipe. In this way, the liquid stored in the pipe prevents the steam in the vulcanization pipe from being leaked outside. As a result, the sealing performance can be ensured. Furthermore, friction between the rubber hose and the annular member is prevented because high-pressure liquid runs in the gap between the hole and the rubber hose, and is kept being discharged outside of the pipe. This can prevent the outer surface of the rubber hose from being damaged due to the friction. Furthermore, because the diameter of the hole is larger than the outer diameter of the rubber hose, the rubber hose is not pressed by the hole and is not deformed. As a result, the pipe is not clogged with the rubber hose. As a result, the productivity can be ensured.

DESCRIPTION OF EMBODIMENTS

The following will describe a preferred embodiment of the present invention with reference to figures.
(Configuration of Rubber Hose Continuous Vulcanizing Device)

Figure 1:
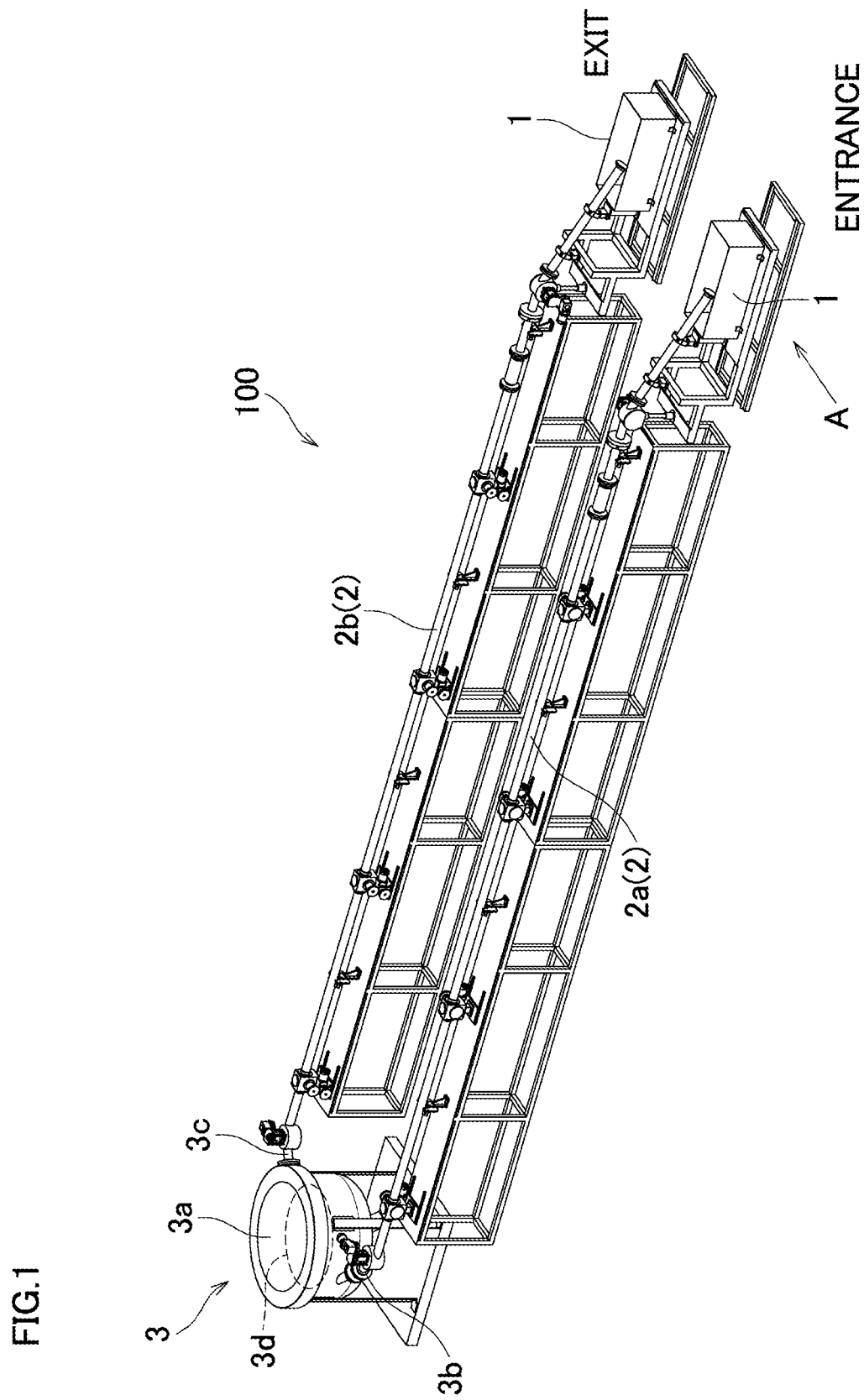
FIG. 1 is a perspective view of a rubber hose continuous vulcanizing device related to one embodiment of the present invention.

The rubber hose continuous vulcanizing device of an embodiment of the present invention continuously vulcanizes a rubber hose including one or more rubber layers, by causing the rubber hose to pass through the inside of the vulcanization pipe filled with steam. As shown in FIG. 1, a continuous vulcanizing device 100 includes: sealing devices 1 which are respectively disposed at an inlet and an outlet; a vulcanization pipe 2 including a first vulcanization pipe 2a and a second vulcanization pipe 2b; and a direction switching device 3 disposed between the first vulcanization pipe 2a and the second vulcanization pipe 2b.

In the rubber hose, an inner layer, a reinforcement layer, and an outer layer are formed in this order. In the rubber hose, the inner layer is provided around a mandrel, the reinforcement layer is provided around this inner layer, and the outer layer is provided around this reinforcement layer by extrusion molding. The rubber hose is vulcanized by the continuous vulcanizing device 100 while the rubber hose is surrounded by resin. After the vulcanization, the resin surrounding the rubber hose is removed and the mandrel in the rubber hose is removed, and the rubber hose is wound to form a predetermined shape. The removed resin is reused.

The vulcanization pipe 2 is filled with high-pressure (e.g. 1 MPa) steam. The steam is supplied to the vulcanization pipe 2 from an unillustrated supply port. The first vulcanization pipe 2a is provided to connect the entrance of the continuous vulcanizing device 100 to the direction switching device 3, and extends in a first direction. The second vulcanization pipe 2b is provided to connect the direction switching device 3 to the exit of the continuous vulcanizing device 100, and extends in a second direction which is opposed to the first direction. The rubber hose is vulcanized continuously by passing through the vulcanization pipe 2. Noted that the vapor used for the vulcanization is not limited to the steam, and may be alcohol vapor, for example.

The direction switching device 3 includes a hollow container 3a, an entrance tube 3b, and an exit tube 3c. Inside the container 3a, a disk-shaped turn reel 3d which guides the rubber hose is provided horizontally. The entrance tube 3b connects the container 3a and the first vulcanization pipe 2a. The exit tube 3c connects the container 3a and the second vulcanization pipe 2b.

The rubber hose having passed through the first vulcanization pipe 2a is led into the container 3a via the entrance tube 3b, and then the passing direction is changed 180 degrees by being guided by the turn reel. After that, the rubber hose is discharged from the container 3a via the exit tube 3c, and passes through the second vulcanization pipe 2b. As described above, the direction switching device 3 is disposed between the first vulcanization pipe 2a and the second vulcanization pipe 2b, and is configured to switch the passing direction of the rubber hose.

In the present embodiment, the direction switching device 3 is filled with high-pressure (e.g. 1 MPa) steam. That is, each of the container 3a, the entrance tube 3b, and the exit tube 3c is filled with steam. In this way, by causing the inside of the direction switching device 3 to be filled with the steam, vulcanization is possible in the direction switching device 3 which has traditionally been configured to only switch the passing direction of the rubber hose.

In Patent Literature 1, the rubber hose is conveyed to a heating plate after first vulcanization is performed with a heating medium, and then second vulcanization is performed at the heating plate. However, with this arrangement, the temperature of the rubber hose heated in the first vulcanization decreases while the rubber hose is conveyed to the heating plate. The temperature of the rubber hose needs to be re-increased in the second vulcanization, and this results in poor vulcanization efficiency.

Furthermore, when the vulcanization is performed with the heating medium and the direction switching device switches the passing direction of the rubber hose in order to achieve space saving as shown in FIG. 1, it is unrealistic to charge the heating medium inside the direction switching device and heat the heating medium to the suitable temperature for the vulcanization, because of the cost and the constructional matter of the device. Because of this, typically, the vulcanization is not performed in a direction switching device in the case above. Because the temperature of the rubber hose decreases while passing through the direction switching device, the temperature of the rubber hose needs to be re-increased in the vulcanization pipe on the downstream side. This results in poor vulcanization efficiency.

Meanwhile, in the present embodiment, the rubber hose is continuously vulcanized in the first vulcanization pipe 2a, the direction switching device 3, and the second vulcanization pipe 2b in this order, with the result that the temperature of the rubber hose does not decrease while the rubber hose is vulcanized. With this arrangement, it is not necessary to re-increase the temperature of the rubber hose whose temperature became low while being vulcanized, as a result, vulcanization efficiency can be improved. Furthermore, it is not necessary to seal the exit of the first vulcanization pipe 2a and the entrance of the second vulcanization pipe 2b. Therefore, defects due to the sealing can be reduced.
(Configuration of Sealing Device)

Next, the following will describe the sealing devices 1 which are respectively disposed at the entrance and the exit of the continuous vulcanizing device 100. Noted that the configuration of the sealing device 1 disposed at the entrance of the continuous vulcanizing device 100 and the configuration of the sealing device 1 disposed at the exit of the continuous vulcanizing device 100 are same except for some parts. Therefore, the following will describe mainly the sealing device 1 disposed at the entrance.

Figure 2:
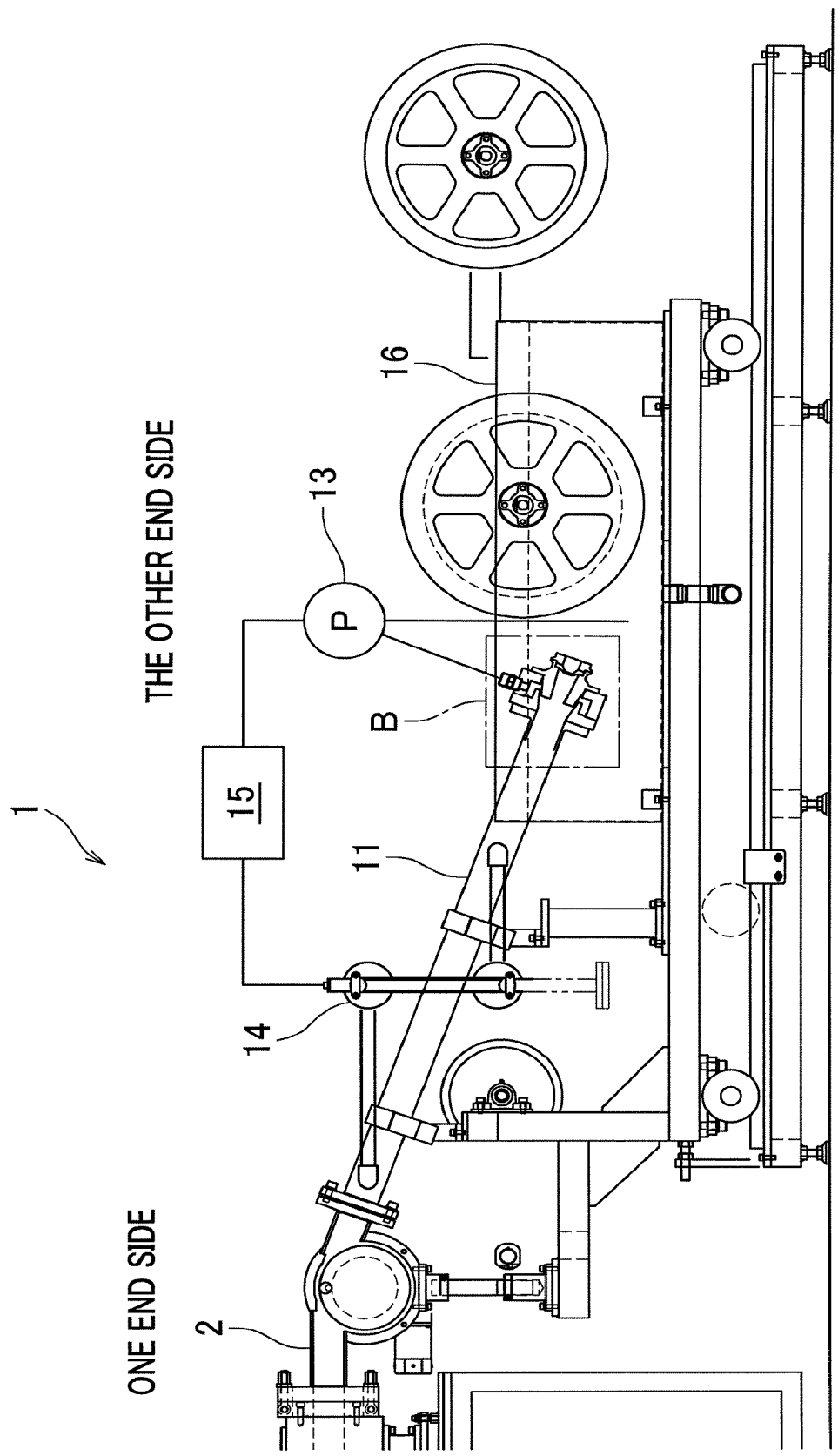
FIG. 2 is a side view of a sealing device.

FIG. 2 is a side view of the sealing device 1 when FIG. 1 is seen in A direction, and as shown in FIG. 2, the sealing device 1 includes a pipe 11 and a pump 13. The pipe 11 is inclined downward from one end (left side in the figure) to the other end (right side in the figure). The diameter of the pipe 11 and the vulcanization pipe 2 is substantially same, and the one end side of the pipe 11 is connected to the vulcanization pipe 2. In the side face on the other end side of the pipe 11, an inlet is provided. The pump 13 pumps water into the pipe 11 through this inlet. The pressure (e.g., 1.1 MPa) of this water is higher than that of steam with which the vulcanization pipe 2 is filled. Noted that the liquid to be pumped into the pipe 11 is not limited to water. The liquid may be a liquid which does not contaminate the rubber hose when adhered to the rubber hose, such as alcohol.

As described below, a part of the water pumped into the pipe 11 is discharged outside of the pipe 11. The pump 13 pumps more water into the inlet than the water discharged from the pipe 11. With this arrangement, water is stored in the pipe 11.

The sealing device 1 includes a liquid level gauge 14 and a controller 15. The liquid level gauge 14 is configured to detect a vertical position of the water surface in the pipe 11. The liquid level gauge 14 includes, for example, sensors which are respectively disposed at a upper limit position and a lower limit position of the water level. The controller 15 controls discharge amount from the pump 13 based on the detection result of the liquid level gauge 14 so that the vertical position of the water surface is constant.

Furthermore, the sealing device 1 includes a liquid storage tank 16. The liquid storage tank 16 stores water discharged outside of the pipe 11. The water surface in the liquid storage tank 16 is arranged higher than a later-described hole 12a through which water discharged outside of the pipe 11 passes. This arrangement prevents the water discharged outside of the pipe 11 from being scattered, because the water discharged outside of the pipe 11 is discharged into the water in the liquid storage tank 16. The pump 13 pumps up the water stored in the liquid storage tank 16, and pumps the water into the pipe 11 through the inlet. In this way, the pump 13 circulates water between the pipe 11 and the liquid storage tank 16.

Figure 3:
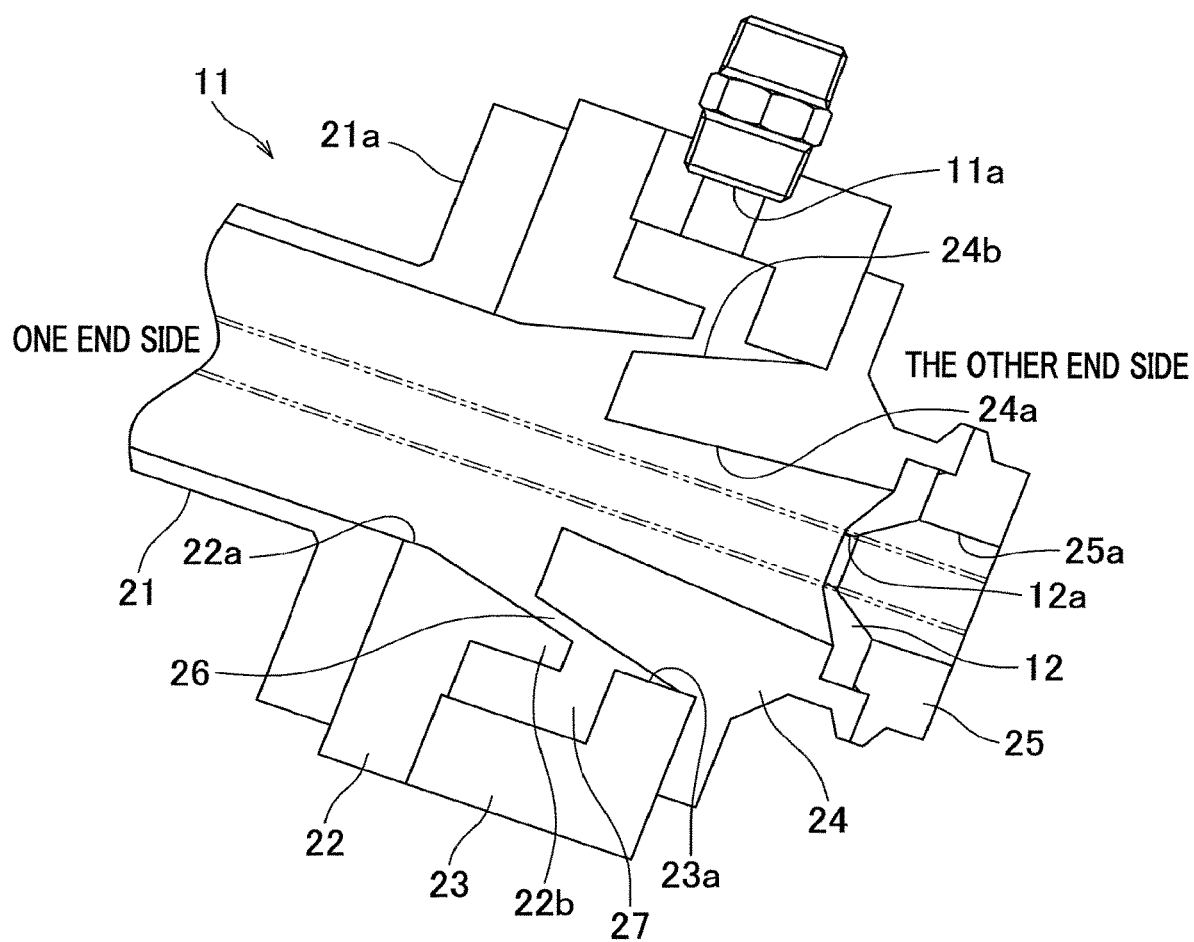
FIG. 3 is an enlarged cross section of the main part B in FIG. 2.

As shown in FIG. 3 which is a enlarged cross section of the main part B in FIG. 2, the sealing device 1 includes an annular member 12 attached to the pipe 11. The annular member 12 is made of metal and is attached to the pipe 11 so as to close an opening on the other end side of the pipe 11. The annular member 12 includes a hole 12a through which a rubber hose passes. The hole 12a has a larger diameter than the outer diameter of a rubber hose surrounded by resin. For example, when the outer diameter of the rubber hose surrounded by resin is 16 mm, the diameter of the hole 12a is approximately 17 mm. Therefore, water in the pipe 11 is discharged through the gap between the hole 12a and the rubber hose.

The pipe 11 includes: a linear pipe 21; a first connecting member 22 which is larger in diameter than the pipe 21; a second connecting member 23, a space being formed between the first connecting member 22 and the second connecting member 23; a third connecting member 24 which is partially fitted into the second connecting member 23; and a fourth connecting member 25. The pipe 11 has these members in this order from one end side to the other end side.

The pipe 21 includes a flange 21a at the other end. The first connecting member 22 is fixed to the flange 21a with a bolt. The first connecting member 22 includes a hole 22a which communicates with the pipe 21. A protrusion 22b is provided around the hole 22a to protrude toward the other end side. The protrusion 22b has a slope which is inclined so that the diameter of the protrusion 22b increases from one end side to the other end side.

The second connecting member 23 is fitted in the first connecting member 22. The second connecting member 23 includes a hole 23a which communicates with the pipe 21. The second connecting member 23 and the protrusion 22b of the first connecting member 22 are separated from each other. In The side wall of the second connecting member 23, an inlet 11a for supplying water into the pipe 11 is provided.

The third connecting member 24 is fixed to the second connecting member 23 with a bolt while a part of the third connecting member 24 is inserted into the hole 23a of the second connecting member 23. A passage 24a is formed at the center of the third connecting member 24. The diameter of the passage 24a gradually decreases from the other end side to one end side. An outer surface 24b of the part of the third connecting member 24, which is inserted in the hole 23a, is inclined so that the diameter decreases from the other end side to one end side. An annular passage 26 is formed between the outer surface 24b and the protrusion 22b of the first connecting member 22.

The protrusion 22b of the first connecting member 22 is arranged so as to oppose the inlet 11a. An annular space 27 is formed between the protrusion 22b and the sidewall of the second connecting member 23. The outside surface 24b of the third connecting member 24 is located on the inner side of the protrusion 22b and opposes the inlet 11a. The pumped water from the inlet 11a is stored in the space 27 and flows to the one end side through the passage 26. As described above, the protrusion 22b and the third connecting member 24 function as guide members to guide the pumped water from the inlet to the one end side.

The fourth connecting member 25 is fixed to the third connecting member 24 while sandwiching the annular member 12 with the third connecting member 24. In the center of the fourth connecting member 25, an opening 25a which communicates with the hole 12a of the annular member 12 is provided. The diameter of the opening 25a is larger than the diameter of the hole 12a.

Noted that the annular member 12 is inclined toward the hole 12a from the peripheral edge portion, in cross section. In the sealing device 1 disposed at the entrance of the continuous vulcanizing device 100, a rubber hose passes through the hole 12a from the other end side to the one end side. In this regard, as shown in FIG. 3, the annular member 12 is provided so that the hole 12a of the annular member 12 is on the one end side of the peripheral edge portion. With this arrangement, the rubber hose is less likely to be caught at the edge of the hole 12a. On the other hand, in the sealing device 1 disposed at the exit of the continuous vulcanizing device 100, the rubber hose passes through the hole 12a from the one end side to the other end side. Because of this, in the sealing device 1 disposed at the exit, the annular member 12 is arranged in a reversed manner as compared to the annular member 12 shown in FIG. 3.

(Operation of Sealing Device)

In the above described structure, when the vulcanization of rubber hose is performed in the continuous vulcanizing device 100, the pressed water is pumped into the pipe 11 by the pump 13 through the inlet 11a, as shown in FIG. 2. Part of the water pumped into the pipe 11 is discharged outside of the pipe 11 through the gap between the rubber hose and the hole 12a which is provided in the annular member 12 and in which a rubber hose passes thorough. However, by pumping more water than the water discharged outside of the pipe 11 into the inlet 11a, the rest of the water is stored in the pipe 11. Water quantity in the pipe 11 is kept constant by pumping up the water in the liquid storage tank 16 and pumping the water into the pipe 11 with the pump 13.

In this way, the water stored in the pipe 11 prevents the steam in the vulcanization pipe 2 from being leaked outside. As a result, the sealing performance can be ensured.

As shown in FIG. 3, a rubber hose passes through the hole 12a of the annular member 12. At this time, friction between the rubber hose and the annular member 12 is prevented because high-pressure water runs in the gap between the hole 12a and the rubber hose, and is kept being discharged outside of the pipe 11. This can prevent the outer surface of the rubber hose from being damaged due to the friction. Furthermore, because the diameter of the hole 12a is larger than the outer diameter of the rubber hose, the rubber hose is not pressed by the hole 12a and is not deformed, with the result that the pipe 11 is not clogged with the rubber hose. As a result, the productivity can be ensured.

The water pumped into the pipe 11 is stored in the space 27 and flows to the one end side through the passage 26. In this way, as the water pumped from the inlet 11a is guided to the one end side, it is possible to restrain the pumped water from being directly discharged outside of the pipe 11. With this arrangement, water can be suitably stored in the pipe 11. Furthermore, because the protrusion 22b and the third connecting member 24 are provided to oppose the inlet 11a, it is possible to prevent high-pressure water pumped from the inlet 11a from directly colliding with the flank of the rubber hose. This allows stable conveyance of the rubber hose.

As shown in FIG. 2, a vertical position of the water surface in the pipe 11 is detected by the liquid level gauge 14, and the ejection amount from the pump 13 is controlled by the controller 15 so that the vertical position of the water surface is constant. As a result, because a predetermined amount of water is always stored in the pipe 11, prevention of leakage of steam in the vulcanization pipe 2 to the outside is ensured.

The water discharged outside of the pipe 11 is stored in the liquid storage tank 16. The pump 13 pumps up the water stored in the liquid storage tank 16, and pumps the water into the pipe 11 through the inlet 11a. In this way, by circulating water between the pipe 11 and the liquid storage tank 16 with the pump 13, the amount of water used can be suppressed.

(Effects)

As described above, according to the sealing device 1 and the sealing method of the present embodiment, a part of the water pumped into the pipe 11 is discharged outside of the pipe 11 through the gap between the rubber hose and the hole 12a which is provided in the annular member 12 and in which a rubber hose passes thorough. However, by pumping more water than the water discharged outside of the pipe 11 into the inlet 11a, the rest of the water is stored in the pipe 11. This water stored in the pipe 11 prevents the steam in the vulcanization pipe 2 from being leaked outside. As a result, the sealing performance can be ensured. Friction between the rubber hose and the annular member 12 is prevented because high-pressure water runs through the gap between the hole 12a and the rubber hose, and is kept being discharged outside of the pipe 11. This can prevent the outer surface of the rubber hose from being damaged due to the friction. Furthermore, because the diameter of the hole 12a is larger than the outer diameter of the rubber hose, the rubber hose is not pressed by the hole 12a and is not deformed. As a result, the pipe 11 is not clogged with the rubber hose. As a result, the productivity can be ensured.

The vertical position of the water surface of the water in the pipe 11 is detected, and the ejection amount from the pump 13 is controlled so that the vertical position of the water surface is constant. As a result, because a predetermined amount of water is always stored in the pipe 11, prevention of leakage of steam in the vulcanization pipe 2 to the outside is ensured.

Furthermore, as the water pumped from the inlet 11a is guided to the one end side, it is possible to restrain the pumped water from being directly discharged outside of the pipe 11. With this arrangement, water can be suitably stored in the pipe 11. Furthermore, because the guide members (the protrusion 22b and the third connecting member 24) are provided to oppose the inlet 11a, it is possible to prevent high-pressure water pumped from the inlet 11a from directly colliding with the flank of the rubber hose. This allows stable conveyance of the rubber hose.

Water discharged outside of the pipe 11 through the gap between the hole 12a and the rubber hose is stored in the liquid storage tank 16, and the pump 13 pumps up the water from the liquid storage tank 16, and pumps the water into the inlet 11a. In this way, by circulating water between the pipe 11 and the liquid storage tank 16 with the pump 13, the amount of water used can be suppressed.

According to the continuous vulcanizing device 100 and the vulcanizing method of the present embodiment, by filling the inside of the direction switching device 3 with the steam, the vulcanization can be performed in the direction switching device 3 which has traditionally been configured to only switch the passing direction of the rubber hose. On this account, the rubber hose is continuously vulcanized in the first vulcanization pipe 2a, the direction switching device 3, and the second vulcanization pipe 2b in this order, with the result that the temperature of the rubber hose does not decrease while the rubber hose is vulcanized as compared to the case where vulcanization is performed only in the first vulcanization pipe 2a and the second vulcanization pipe 2b. With this arrangement, it is not necessary to re-increase the temperature of the rubber hose whose temperature is decreased while being vulcanized, as a result, vulcanization efficiency can be improved. Furthermore, it is not necessary to seal the outlet of the first vulcanization pipe 2a and the inlet of the second vulcanization pipe 2b. Therefore, defects due to the sealing can be reduced.

The above embodiment thus described solely serves as a specific example of the present invention, and the present invention is not limited to such an example. Specific structures and various means may be suitably designed or modified. Further, the effects described in the above embodiment are no more than examples of preferable effects brought about by the present invention, and the effects of the present invention are not limited to those described hereinabove.

REFERENCE SIGNS LIST 1 sealing device
2 vulcanization pipe
2a first vulcanization pipe
2b second vulcanization pipe
3 direction switching device
3a container
3b entrance tube
3c exit tube
11 pipe
11a inlet
12 annular member
12a hole
13 pump
14 liquid level gauge
15 controller
16 liquid storage tank 21 pipe
21a flange
22 first connecting member
22a hole
22b protrusion
23 second connecting member
23a hole
24 third connecting member
24a passage
24b outer surface
25 fourth connecting member
25a opening
26 passage
27 space
100 continuous vulcanizing device

The invention claimed is:

1. A sealing device which is disposed at each of an entrance and an exit of a rubber hose continuous vulcanizing device configured to continuously vulcanize a rubber hose including one or more rubber layers by causing the rubber hose to pass through an inside of a vulcanization pipe filled with steam, for preventing the steam in the vulcanization pipe from leaking to outside of the vulcanization pipe, each sealing device comprising:

a pipe which is provided to be coaxial with the vulcanization pipe, has one end connected to the vulcanizing pipe, and is inclined downward from the one end to an other end, pressurized liquid being pumped into the pipe from an inlet disposed at a side face on the other end side;

an annular member which is attached to the pipe so as to close an opening on the other end side of the pipe, the annular member having a hole whose inner diameter is larger than an outer diameter of the rubber hose to thereby provide a gap between the inner diameter of the annular member and the outer diameter of the rubber hose, and through which the rubber hose passes;

a pump which is configured to store the liquid in the pipe by continuously pumping an amount of liquid into the inlet that is more than an amount of liquid that is discharged outside of the pipe while part of the liquid pumped into the pipe is continuously discharged outside of the pipe through the gap between the inner diameter of the hole and the outer diameter of the rubber hose;

a liquid level gauge configured to detect a vertical position of liquid level of the liquid in the pipe;

a controller configured to control the amount of liquid pumped from the pump so that the vertical position of the liquid level is constant, based on a detection result of the liquid level gauge; and a guide member disposed in the pipe at a position between the inlet and a longitudinal axis of the pipe so as to oppose the inlet, and guides the liquid, which is pumped from the inlet, to the one end side, wherein leakage of the steam in the vulcanization pipe to the outside of the vulcanization pipe is prevented by the liquid stored in the pipe, wherein, as the rubber hose passes through the hole of the annular member, the inner diameter of the hole surrounds the rubber hose and is separated from the rubber hose by the gap such that the rubber hose is out of contact with the hole, and wherein, when the rubber hose is passing through the hole of the annular member, the liquid is kept pumped into the inlet and the liquid is kept discharged through the gap between the inner diameter of the hole and the outer diameter of the rubber hose.

2. The sealing device according to claim 1, wherein, the pipe is disposed so as to be inclined downward from one end to the other end, a liquid storage tank which stores the liquid discharged outside of the pipe is provided, and the pump pumps the liquid which is pumped up from the liquid storage tank into the inlet.

3. A rubber hose continuous vulcanizing device configured to continuously vulcanize a rubber hose including one or more rubber layers, by causing the rubber hose to pass through the inside of a vulcanization pipe filled with steam, the vulcanization pipe including a first vulcanization pipe and a second vulcanization pipe that are different from each other in a passing direction of the rubber hose, the rubber hose continuous vulcanizing device comprising: the sealing device according to claim 1; and a direction switching device which is provided between the first vulcanization pipe and the second vulcanization pipe, in which the rubber hose passes through, wherein the direction switching device includes a disk-shaped turn reel which is configured to switch the passing direction of the rubber hose between the first vulcanization pipe and the second vulcanization pipe being provided inside the direction switching device, and the inside of the direction switching device being filled with the steam.

4. A sealing method for sealing each of an entrance and an exit of a rubber hose continuous vulcanizing device which is configured to continuously vulcanize a rubber hose including one or more rubber layers by causing the rubber hose to pass through the inside of a vulcanization pipe filled with steam, in order to prevent the steam in the vulcanization pipe from leaking to outside of the vulcanization pipe, the method comprising the steps of:

pumping pressurized liquid into an inlet provided in a side face on an other end side of a pipe provided to be coaxial with the vulcanization pipe, inclined downward from the one end to an other end, and having one end connected to the vulcanization pipe;

passing the rubber hose through a hole provided in an annular member, the hole having an inner diameter that is larger than an outer diameter of the rubber hose to thereby provide a gap between the inner diameter of the hole and the outer diameter of the rubber hose, the annular member being attached to the pipe so as to close an opening on the other end side of the pipe;

pumping the liquid into the inlet and discharging the liquid through the gap between the inner diameter of the hole and the outer diameter of the rubber hose when the rubber hose is passing through the hole of the annular member;

storing the liquid in the pipe by continuously pumping an amount of liquid into the inlet that is more than an amount of liquid that is discharged outside of the pipe while part of the liquid pumped into the pipe is continuously discharged outside of the pipe through the gap between the inner diameter of the hole and the outer diameter of the rubber hose;

detecting a vertical position of liquid level of the liquid in the pipe; and controlling the amount of liquid pumped from the pump so that the vertical position of the liquid level is constant, based on a detection result, wherein leakage of the steam in the vulcanization pipe to the outside of the vulcanization pipe is prevented by the liquid stored in the pipe, and wherein, as the rubber hose passes through the hole of the annular member, the inner diameter of the hole surrounds the rubber hose and is separated from the rubber hose by the gap such that the rubber hose is out of contact with the hole.

5. The sealing method according to claim 4, further comprising the step of guiding the liquid, which is pumped from the inlet, to the one end side with a guide member which is disposed in the pipe so that the guide member opposes the inlet.

6. The sealing method according to claim 4, further comprising:

storing, in a liquid storage tank, the liquid which is discharged outside of the pipe which is disposed so as to be inclined downward from the one end to the other end, the pump pumping up the liquid from the liquid storage tank and pumping the liquid into the inlet.

7. A rubber hose continuous vulcanizing method for continuously vulcanizing a rubber hose including one or more rubber layers, by causing the rubber hose to pass through the inside of a vulcanization pipe filled with steam, the vulcanization pipe including a first vulcanization pipe and a second vulcanization pipe, the rubber hose continuous vulcanizing method comprising: the sealing method according to claim 6; and the step of filling the inside of a direction switching device with the steam, the direction switching device being provided between the first vulcanization pipe and the second vulcanization pipe, the rubber hose passing through the direction switching device, and the direction switching device being configured to switch a passing direction of the rubber hose between the first vulcanization pipe and the second vulcanization pipe.

\* \* \* \* \*